United States Patent [19]

Roos

[11] Patent Number: 5,699,276
[45] Date of Patent: Dec. 16, 1997

[54] UTILITY METER PROVIDING AN INTERFACE BETWEEN A DIGITAL NETWORK AND HOME ELECTRONICS

[76] Inventor: Charles E. Roos, 2507 Ridgewood Dr., Nashville, Tenn. 37215

[21] Appl. No.: 574,429

[22] Filed: Dec. 15, 1995

[51] Int. Cl.$^6$ .......................... G06F 17/00; G08C 19/16
[52] U.S. Cl. ............................. 364/514 A; 340/870.01; 364/464.22; 395/200.01; 395/200.02
[58] Field of Search ................... 340/870.01, 870.02, 340/870.03; 364/464.04, 514 A, 464.22; 395/200.01, 200.02

[56] References Cited

U.S. PATENT DOCUMENTS

| | | | |
|---|---|---|---|
| 4,174,517 | 11/1979 | Mandel | 340/310 A |
| 4,200,862 | 4/1980 | Campbell et al. | 340/310 A |
| 4,332,980 | 6/1982 | Reynolds et al. | 179/2 A |
| 4,418,333 | 11/1983 | Schwartzbach et al. | 340/310.01 |
| 4,455,453 | 6/1984 | Parasekvakos et al. | 179/2 AM |
| 4,803,632 | 2/1989 | Frew et al. | 364/464.04 |
| 4,804,957 | 2/1989 | Selph et al. | 340/870.03 |
| 4,904,995 | 2/1990 | Bonner et al. | 340/870.02 |
| 5,066,939 | 11/1991 | Mansfield, Jr. | 340/310 R |
| 5,101,191 | 3/1992 | Macfadyen et al. | 340/310 R |
| 5,430,430 | 7/1995 | Gilbert | 340/310.01 |
| 5,553,094 | 9/1996 | Johnson et al. | 375/200 |

OTHER PUBLICATIONS

Todd Lappin, *Wired*, Aug. 1995, "Country Road Warrior", pp. 46 and 50.

Ross Kerber, *The Wall Street Journal*, Marketplace, Jan. 27, 1997, "Utilities Reach Out to Add Phone, Cable Service", pp. B1 and B10.

Nancy Salucci, http://www.snowcrest.net/iums/index.html, Jun. 10, 1996, revised Sep. 1996, "Utility Systems Corporation Intelligent Utility Meter System (IUMS)", 9 pages printed from web site.

http://www.at.com/pres/0297970225.pca.html, Feb. 25, 1997, "AT&T's breakthrough wireless technology new alternative for local service", 5 pages printed from web site.

*San Francisco Chronicle*, Business, Feb. 21, 1996, "HP Joining With CellNet to Automate Utilities".

*Electric Light & Power*, Mar. 1996, vol. 74, No. 3, "Telecom bill swings door wide with open for utilities".

*Electric Light & Power*, Mar. 1996, vol. 74, No. 3, "IOUs welcome telecommunications reform".

CableBus Systems Corporation, Production Guide '95, Broadband Modems for Meter Readings, Load Control, Cable Security, Home Messaging, Traffic Light & Water Control Systems, Portland, OR.

*Primary Examiner*—Edward R. Cosimano
*Attorney, Agent, or Firm*—Foley & Lardner

[57] ABSTRACT

A utility meter interface apparatus is connected between a utility company and a home. The utility meter interface includes a utility meter for measuring utility usage and a computer located external to the home. The computer is connected to the utility meter and provides an interface between a communication network and a device located inside the home. The computer may be adapted to communicate with the device over the home's internal wiring.

37 Claims, 5 Drawing Sheets

UTILITY METER PROVIDING AN INTERFACE BETWEEN A DIGITAL NETWORK AND HOME ELECTRONICS

BACKGROUND OF THE INVENTION

1. Field of the Invention

The invention is related to utility meters having associated electronics and, more particularly, to a utility meter having a computer interface between a digital service network and a utility user's home electronics. The invention further relates to remote utility meter reading and remote load management.

2. Related Art

A customer of an electric company typically has an electric meter located at the customer's structure or site of distribution of electrical power. The customer's structure may be, for example, the customer's home or office. The electric meter is owned by the electric company and is installed in a standard meter box which holds the electric meter. The standard meter box is provided and owned by the customer.

The prior art includes a number of references which disclose utility meters with associated electronics.

U.S. Pat. No. 4,455,453 issued to Parasekvakos et al., incorporated herein by reference, discloses an apparatus for remote meter reading, wherein a remote unit, preferably located inside a house, periodically initiates a telephone call to a utility company and communicates power usage information.

U.S. Pat. No. 4,803,632 issued to Frew et al., incorporated herein by reference, discloses a utility meter having a CPU, a display, and associated circuitry which may be located in the conventional meter location. Frew also discloses a remote unit located inside the house which displays the meter information and allows the customer to pay his bill by credit card. The remote unit communicates with the CPU over the house's power lines. The meter in Frew can be read by a meter reader either through the house's power lines or via optical coupling at the meter.

U.S. Pat. No. 4,804,957 issued to Selph et al., incorporated herein by reference, discloses a utility meter using a microprocessor-based circuit and Hall effect current sensors to measure power usage. In Selph, the meter may be read by either remote interrogation via a telephone link or serial communication. Selph also discloses a networked submetering arrangement useful in apartment buildings and the like.

U.S. Pat. No. 4,904,995 issued to Bonner et al., incorporated herein by reference, discloses a remote meter reading apparatus which is designed to retrofit existing electric meters with a transponder capable of communicating power usage information to the electric company over the electric power distribution system.

It is also known in the art to utilize a house's power lines for communication between a variety of devices.

U.S. Pat. No. 4,174,517 issued to Mandel, incorporated herein by reference, discloses a central system for controlling remote devices over a house's power line. A central control unit is plugged into a wall outlet for communicating over the power lines with remote units which are also plugged into wall outlets.

U.S. Pat. No. 4,200,862 issued to Campbell et al., incorporated herein by reference, discloses an appliance control system wherein a data transmitter communicates with slave units over a house's power lines by using digital address and operation signals. In Campbell, the data transmitter and various slave units are plugged into wall outlets.

U.S. Pat. No. 5,066,939 issued to Mansfield, Jr., incorporated herein by reference, discloses a circuit for communicating over a house's power lines in which extension telephones are connected to a conventional electrical wall outlet. A master station connector is plugged into a wall outlet and is also connected to the telephone line to facilitate full duplex communication between the extension telephones and the house's telephone line.

It is further known in the art to provide digital network services to a house.

U.S. Pat. No. 4,332,980 issued to Reynolds et al., incorporated herein by reference, discloses a multiple service system which delivers a variety of services to a subscriber over telephone lines. The services disclosed in Reynolds include remote meter reading and load management. In Reynolds, a subscriber data subsystem is placed in the subscriber's house and communicates with peripheral devices over a subscriber data bus. The subscriber data bus is accessed via dedicated wiring and separate data service wall jacks.

U.S. Pat. No. 5,101,191 issued to MacFayden et al., incorporated herein by reference, discloses a house wiring arrangement for controlling the distribution of energy and communications within a house. MacFayden provides a gateway terminal as an interface for communicating outside the house over the public telephone network or power lines.

An article entitled "Country Road Warrior" and written by Todd Lappin, published in the August 1995 issue of WIRED on pages 46 and 50, incorporated herein by reference, discloses an electric company which provides digital network services to its customers using conventional communication technology over a coaxial cable network. The network was originally installed for remote meter reading and later adapted to deliver high-bandwidth data services.

None of the prior art discloses a utility meter which provides an interface between a digital service network and home electronics.

In Parasekvakos, Frew, Selph, and Bonner, the electronics associated with the utility meter are directed primarily to meter reading functions.

In Mandell, Campbell, and Mansfield, communication over the power lines is directed primarily to communication with devices within the house. Also, in Mandell, Campbell, and Mansfield, a separate "master" unit must be located inside the house and plugged into a wall outlet.

In both Reynolds and MacFayden, a house must be wired with a special wiring configuration to accommodate the specific bus structures and communication methods disclosed. Reynolds and MacFayden also require some type of interface unit located inside the house. The network described by the Lappin article does not use a computer in the meter as an interface with the digital network, but rather requires installation of a special jack for connection to the network.

SUMMARY OF THE INVENTION

It is an object of the present invention to overcome the above and other disadvantages in the prior art. Specifically, it is an object of the invention to provide a utility meter with associated electronics to perform functions beyond meter reading, including functions such as providing an interface between a digital services network and home electronics.

It is an object of the invention to provide a digital service network interface which is not located inside the house and does not plug into a wall outlet.

It is an object of the invention to provide digital data services into a house without rewiring the house and without requiring special wiring.

It is an object of the invention to provide conventional meter capabilities in conjunction with associated electronics.

The above and other objects of the invention are accomplished by a utility meter having a standard electric power meter and associated electronics within a meter enclosure and having a standard base suitable for mating with a standard meter box. The associated electronics include a computer having a network interface and a house interface.

The computer may include a video processor and/or descrambler for television services, a modem processor for data services, and a voice processor for telephone services. The computer may also include a meter interface for remote meter reading. The meter interface may be coupled to a circuit breaker box equipped with triacs or solid state switches for load management. The computer may further include a personal computer (PC) interface coupled to the other various processors and interfaces.

The network interface may be coupled to a digital service network which communicates, for example, via satellite, wireless communication, fiber optic cables, coaxial cables, or twisted pair telephone lines. The house interface may be coupled to the house's internal wiring including the house's power lines, telephone lines and television coaxial cables. The house interface may communicate with home electronics via wireless communication through, for example, short range microwave signals such as those used by cordless telephones. The network interface may be directly coupled to the house interface and/or coupled through the various other processors and interfaces.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

DETAILED DESCRIPTION OF THE PREFERRED EMBODIMENTS

Figure 1:
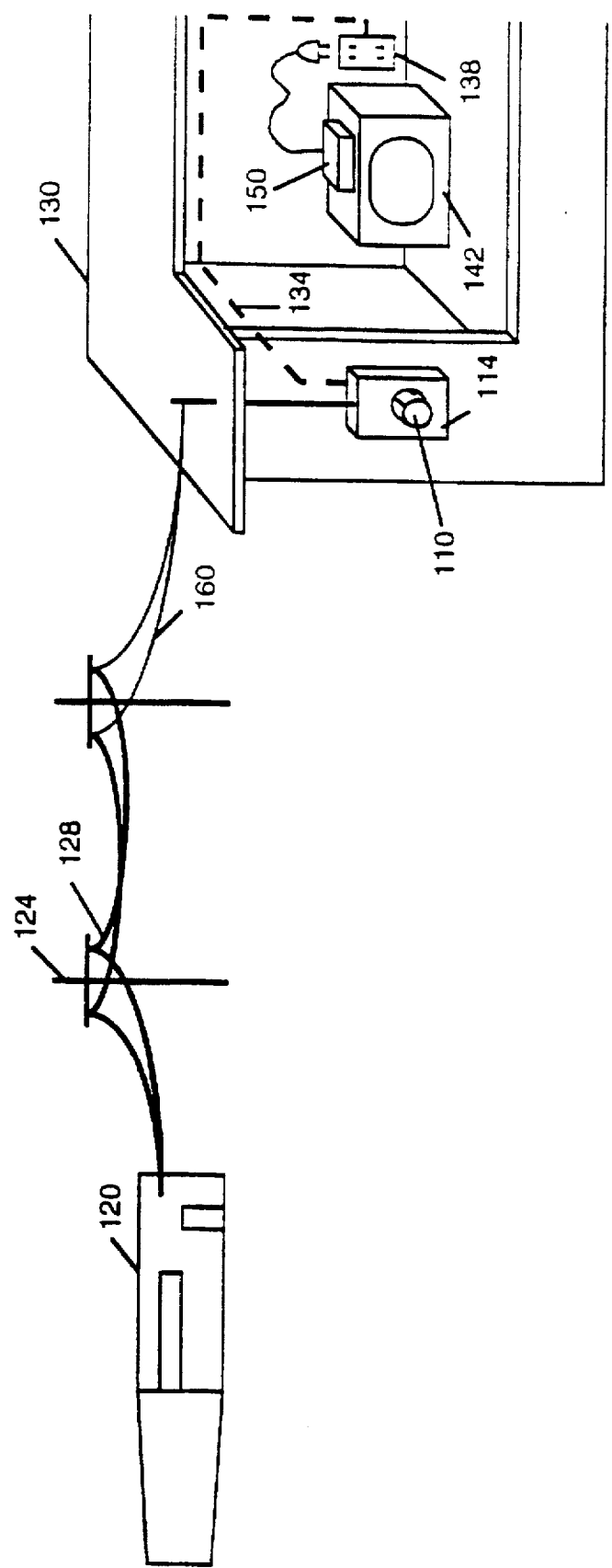
FIG. 1 shows a perspective view of a first embodiment of an electric meter according to the invention which provides an interface between an electric company and a house.

FIG. 1 shows a first embodiment of an electric meter 110 according to the invention mated to a standard meter box 114. An electric company 120 provides electrical service to a house 130 over external power lines 128 suspended by utility poles 124. Alternatively, the electric company 120 may provide electrical service to the house 130 via power lines buried under the ground.

According to the invention, electric company 120 provides a digital service network over a network communication line 160, which may be, for example, fiber optic cable, coaxial cable or twisted pair cable. The electric meter 110 provides an interface between the digital service network and the internal house wiring 134. Internal house wiring 134 may include, for example, power lines, telephone lines, and television coaxial cables. A device 150 can plug into a wall outlet 138 to access the digital service network. Device 150 may, for example, provide video signals to television 142.

As previously discussed, the electric meter 110 is owned by the electric company 120 and is installed in the standard meter box 114 which is provided by a customer. The electric meter 110 according to the invention includes the addition of a video connection and various computer electronics and switches. The electric meter 110 also continues to measure power consumption by standard means. The addition of the computer and video connection greatly extends the capacities of the meter and it permits the electric company to provide, for example, both video and telephone communication in additional to electrical service.

The computer in the electric meter 110 according to the invention may also provide remote readings and load control, interactive communication, and a household computer at very little extra cost. The placement of the computer in the electric meter 110 is advantageous because the electric company can justify the costs of the modified meter to a regulatory agency on the basis of remote meter readings and load control. The electric meter 110 according to the invention can be quickly exchanged and installed in the standard meter box. The invention thus permits a regulated electric utility to have an unregulated subsidiary which can be in the telephone, video or multimedia business.

Further advantages may be realized because many electric companies already run fiber optic or coaxial cables to their major switching stations. Typically, utility companies have easements and own the utility poles. Therefore the electric company can easily extend these cables to each household.

The electric utility also has the option to work with a television cable company to use the cable companies pre-existing coaxial lines. For example, the pre-existing coaxial cable may be run directly to the electric meter 110 according to the invention and thereafter supplied to the house. Alternatively, the coaxial cable may be tapped or spliced using a "T" connector or the like. Either of these configurations are advantageous because the electric meter 110 may be installed and attached to existing coaxial cables quickly without access to the internal wiring of the house. The utility may be in a good position to negotiate with the cable company because it has the alternative of running its own coaxial cable and competing directly, like the electric company in the Lappin article.

Figure 2:
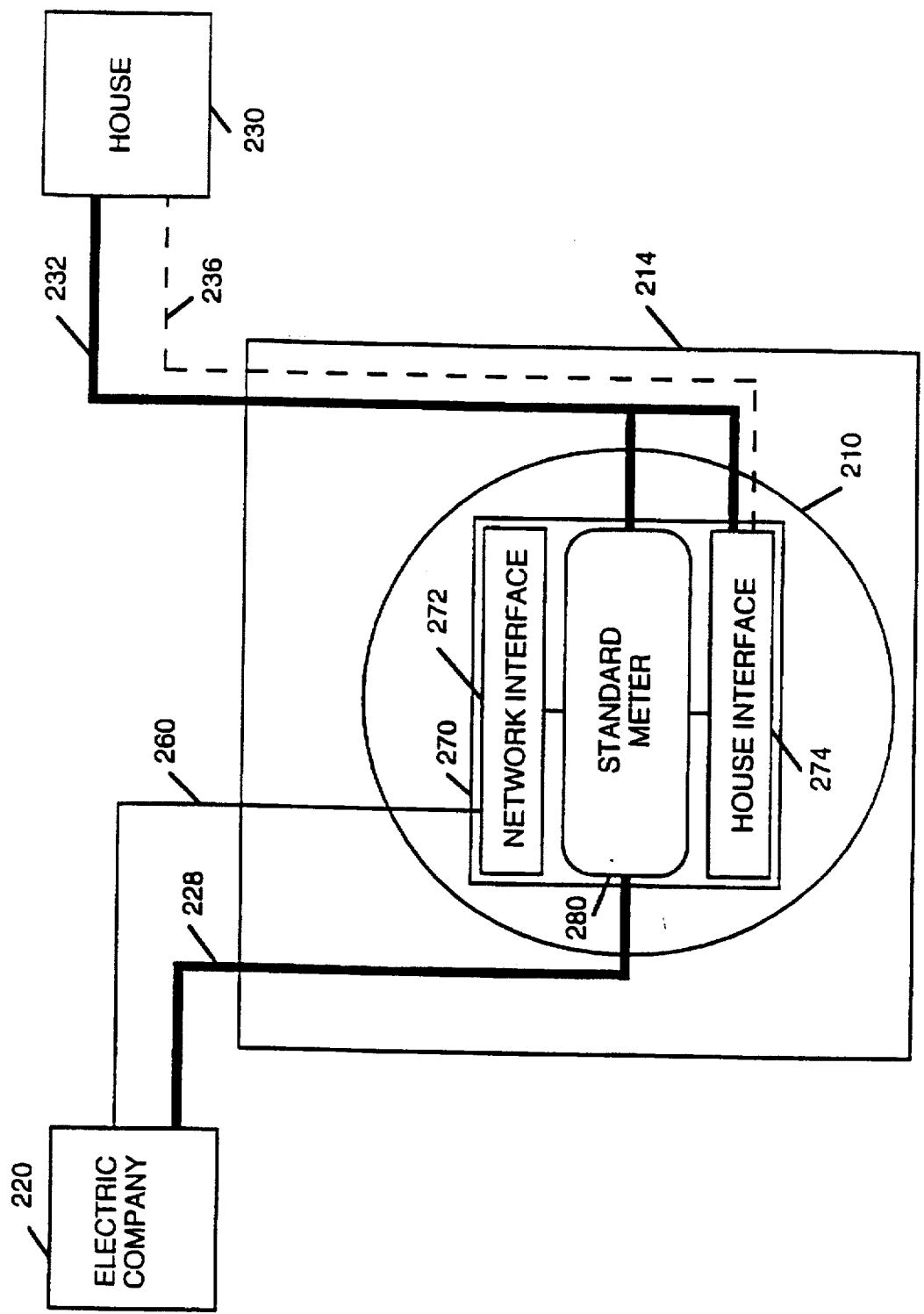
FIG. 2 shows a block diagram of a second embodiment of an electric meter according to the invention which provides an interface between an electric company and a house.

FIG. 2 shows a block diagram of second embodiment of an electric meter 210 according to the invention providing an interface between an electric company 220 which provides a digital service network over network communication line 260 and a house 230. Electric meter 210 is coupled to standard meter box 214 and has a computer 270. Computer 270 is connected to network communication line 260 through a network interface 272. Computer 270 also includes a house interface 274 and a standard electric power meter 280, both of which are coupled with network interface 272. Network interface 272 and house interface 274 may comprise signal processing computers.

Electric company 220 supplies electrical power over external power lines 228 which are connected to standard electric power meter 280 and house's internal power lines 232. House interface 274 is also coupled to house's internal power lines 232 for communication thereon. House interface 274 is further optionally coupled to the house's other internal wiring 236.

The house interface 274 is directly connected to the internal power line 232 and may communicate with devices such as those described in the prior art references. The house interface 274 may also transmit and receive telephone and computer signals over the internal power lines 232 and the network interface 272 may receive and transmit these signals over the network communication line 260. This configuration puts the digital service network in communication with home electronics over the network communication line 260.

The electric utility may, for example, compete with a local telephone company by providing a telephone device adapted to communicate over the internal power line 232 to the house interface 274 and through the network interface 274 to a digital switching service. The electric company could further provide a direct connection to various long distance companies. The electric utility also has the option to contract with the local phone companies and make use of their existing switching systems.

In another example, network interface 272 may function as a computer switch and communication line 260 may comprise a fiber optic cable. A computer switch operating in conjunction with a fiber optic connection to a digital service network can receive several hundred channels of information. House interface 274 may be in communication with a home electronic device, such as a video monitor, and may, in response to a request from the home electronic device, function to select a desired channel for transmission over the internal power lines 232 and/or other internal wiring 236 to the home electronic device. Network interface 272 may be further operative to descramble signals and provide billing information. Because of the ease of installing an electric meter according to the invention and the simplicity of the interfaces, the addition of such a fiber optic connection to a digital service network is relatively inexpensive.

The standard meter box 214 is typically located at a junction of the internal telephone lines, television coaxial cables and power lines, all of which belong to the house owner. An electric meter 210 according to the invention, by being installed the standard meter box 214, puts the electric company 220 in an advantageous position to control the flow of multimedia information. Because of the advantageous location, the invention provides convenient access to the internal house wiring.

The electric company can also provide the house owner a unique advantage by integrating the various functions described herein into the electric meter according to the invention. Because the electric company owns and can replace the pre-existing electric meter with an electric meter according to the invention, the invention eliminates the need for any installation on the part of the customer. The invention is advantageous even in new construction situations, because no additional installation is required. The invention provides a further advantage by not requiring a dedicated wall outlet or special wiring to provide access to a digital service network.

Figure 3:
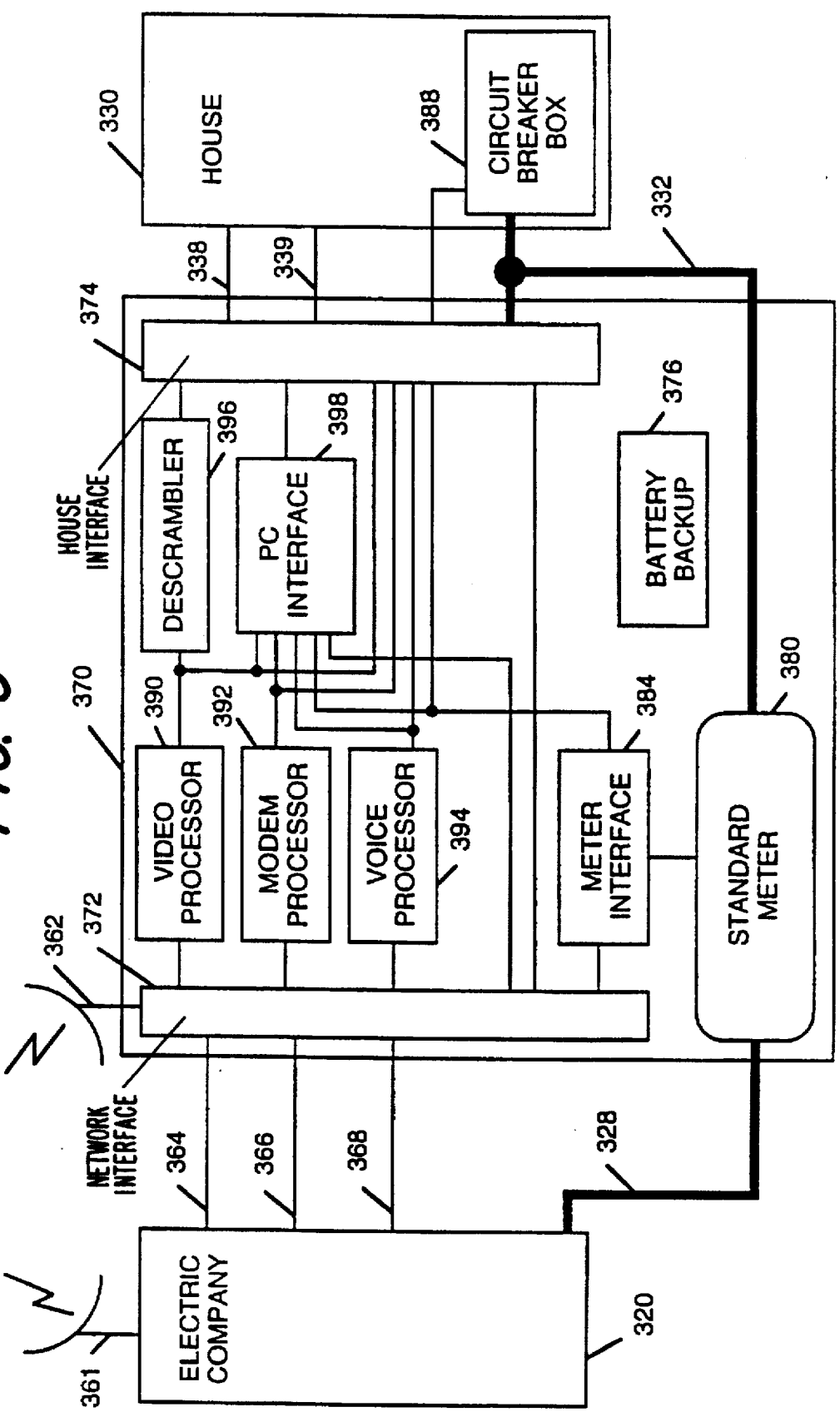
FIG. 3 shows a block diagram of a third embodiment of an electric meter according to the invention which provides an interface between an electric company and a house.

FIG. 3 shows a third embodiment of associated electronics for an electric meter according to the invention with a detailed block diagram of a signal processing computer 370 which provides an interface between an electric company 320 and a house 330. The computer 370 is located in the electric meter (not shown). The electric company 320 provides digital data services via network wireless transmission device 361 and over fiber optic cables 364, coaxial cables 366, and twisted pair cables 368. The computer 370 is coupled to the digital data services through network interface 372.

Network interface 372 provides a remote wireless transmission device 362 to communicate with network wireless transmission 361. Such communication might include transmitting and receiving signals over a selected microwave frequency channel. Data transmission on the selected frequency channel might include such techniques as token ring data transmission, spread spectrum transmission, and/or packet data transmission. Alternatively, wireless transmission media might include infrared, optical, cellular, or satellite communications.

Computer 370 provides a video processor 390, a modem processor 392, a voice processor 394, and a meter interface 384, all of which are coupled to network interface 372, house interface 374, and PC interface 398 for both receiving and transmitting their respective signals. Computer 370 also provides a battery backup 376 to supply power to computer 370 in the event of a power failure. Computer 370 may be operative upon occurrence of such an event to notify electric company 320 of the power failure.

Video processor 390 is further coupled to descrambler 396 for providing descrambled video signals to house interface 374.

Network interface is coupled to PC interface 398. Network interface 372 is further coupled directly to house interface 374 for passing signals through without other processing.

House interface 374 is coupled to house's internal wiring including house's internal power lines 332, telephone lines 338, and television coaxial cables 339. The house interface 374 may also communicate with home electronics via wireless communication. For example, cordless telephones communicate over short range microwave signals. The house interface 374 may utilize similar short range wireless communication.

PC interface 398 is coupled to house interface 374 for providing personal computer functions to users in house 330. Personal computer peripherals which require user access, such as floppy disk drives, audio speakers, and CD ROM drives, may be provided inside the house 330 and communicate with the PC interface 398 through the house interface 374.

Electric company 320 provides electrical power service over external power lines 328. External power lines 328 are coupled through standard electric power meter 380 to circuit breaker box 388. Circuit breaker box 388 passes electrical power service to house over house's internal power lines 332. Meter interface 384 is coupled to standard electric power meter 380 and also to circuit breaker box 388.

The embodiment shown in FIG. 3 is advantageous with respect to power management. For example, the electric company 320 may produce a record of both power use and factor by communicating periodically with meter interface 384. In addition to reduction in costs for meter reading, the third embodiment may detect tampering or attempts at bypassing the meter. The electric meter according to the invention can also notify the utility when there is a power outage. Another example is advantageous billing arrangements. If there was a problem with the customer's payments, the electric company 320 could instruct the computer 370 to notify the customer through, for example, a message on the customer's television.

Regarding load management, the use of triacs or other solid state switches in circuit breaker box 388 enables the electric company 320 to selectively turn on and off the power remotely to specific circuits. For example, the electric company 320 might turn off hot water heater circuits during excess power demands. In another example, the triacs can be used to reduce the voltage if the power company has excess power demands. Triacs could also be used to remotely shut off power if there is evidence of meter tampering, unpaid power bills or a change in the account, such as a request for disconnect.

The electric meter according to the invention also provides advantages for the customer's own energy management. The customer can use the electric meter according to the invention to control lights and appliances. This system will permit the customer to enjoy reduced rates by, for example, running the dishwasher at the times of lowest power demands. The interaction of the TV and internal power lines advantageously permits the power user to control their power use with the TV as a monitor. For example, the electric meter according to the invention can be programmed to give different customers an individual choice of lower power rates by controlling the timing of different loads or higher rates with unrestricted use of power.

The electric meter according to the invention also advantageously provides each household with a personal computer which can use a TV as a monitor. Software for the personal computer may be supplied by the electric company over the digital service network. For example, the electric company might provide a "free" service for school children to use for their homework. This has the advantage of getting children used to using the software made available by the electric company. The electric meter according to the invention might also utilize the personal computer to provide access to the internet and for financial transactions. The electric company can also provide programming to make it very easy for the consumer to pay their power bills each month.

A regulated utility, like an electric company, can justify the costs of the electric meter according to the invention because it will reduce the costs to read meters and it will provide significant help in power management. The unregulated portion of the electric company can obtain revenues from electronic communications. Recent legislation has reduced regulation in communications and this opens the field for the electric company which is already connected to every house. The electric meter according to the invention will enable the electric company to be competition for both the telephone and television cable companies and provides a strong incentive for these companies to work with the electric company by supplying a digital service network over existing telephone and television lines.

Figure 4A:
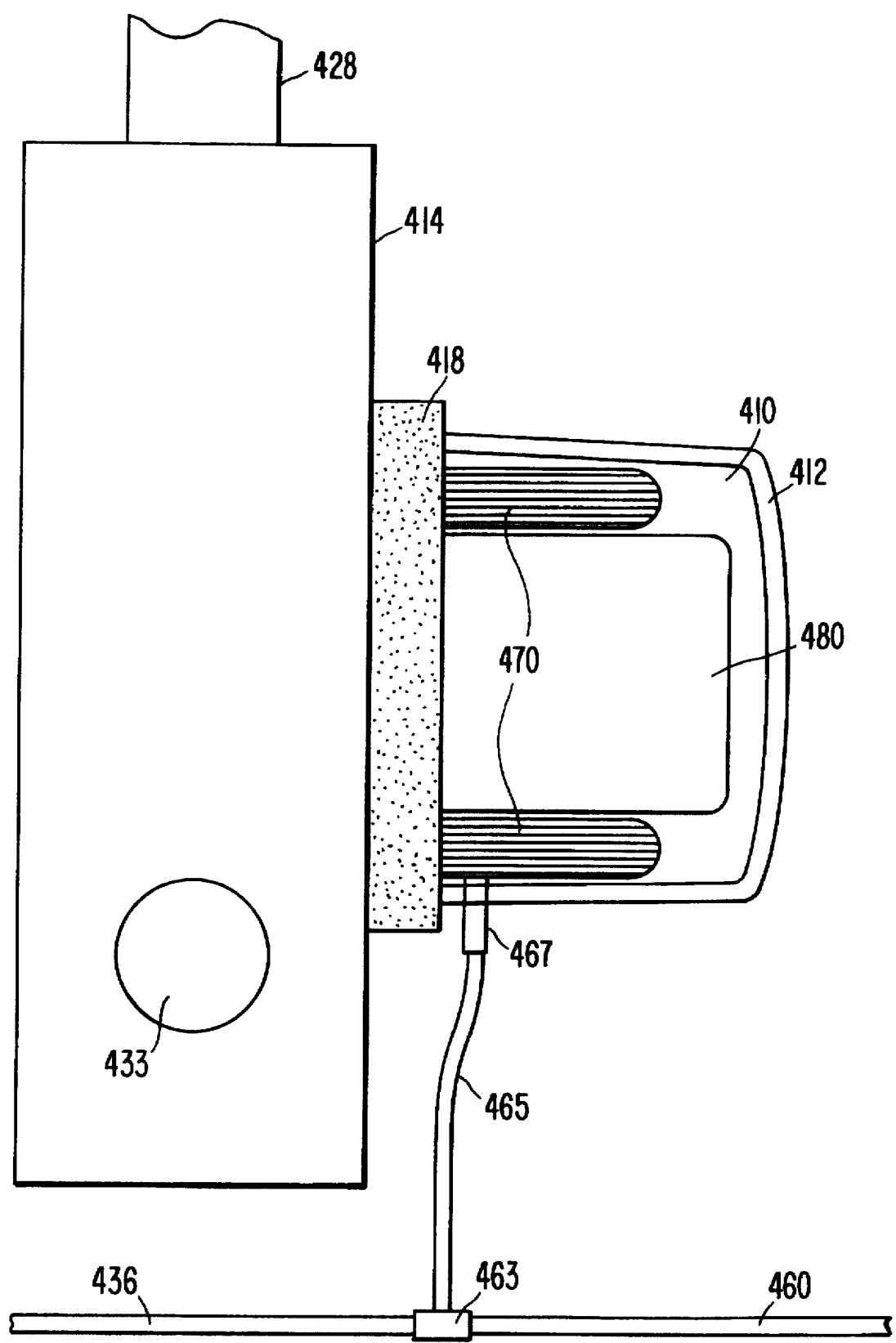
FIG. 4a shows a side view of a fourth embodiment of an electric meter according to the invention.
Figure 4B:
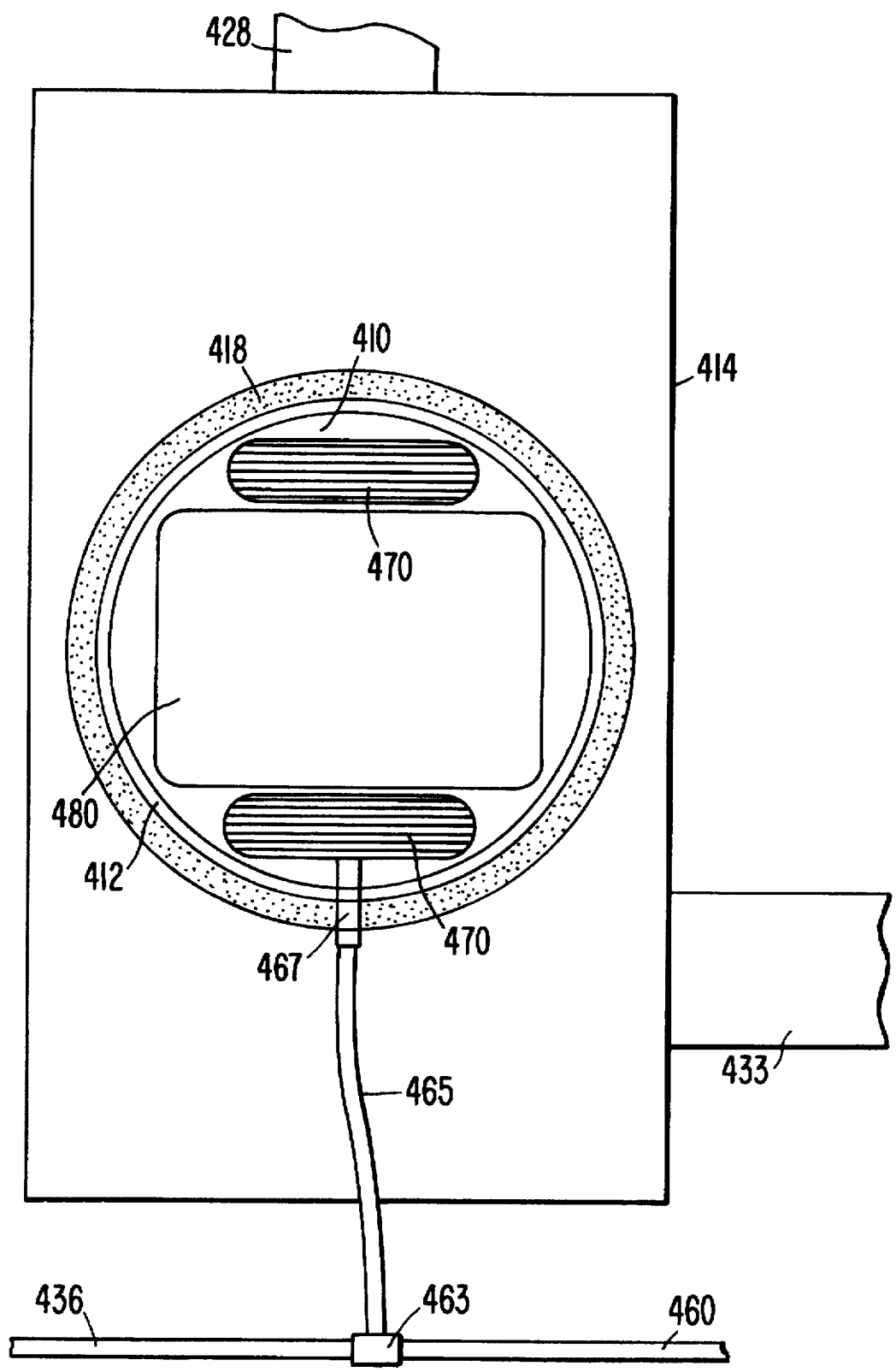
FIG. 4b shows a front view of the fourth embodiment of an electric meter according to the invention.

FIGS. 4a and 4b show a side and a front view, respectively, of a fourth embodiment of an electric meter 410 according to the invention wherein a connection is made to a communication line 460.

Electric meter 410 has a meter enclosure 412 which encloses standard electric power meter 480 and associated electronics 470. Meter enclosure 412 forms a seal with meter seal ring 418 to provide protection from the elements. Electric meter 410 is mated with standard meter box 414. External power lines 428 enter standard meter box 414 from the top and are supplied to a house through a power conduit 433 which exits standard meter box 414 from the side.

Associated electronics 470 are coupled to communication line 460 through a cable 465. Electric meter 410 provides a stress relief 467 for cable 465. Cable 465 is coupled to communication line 460 at connection point 463. Signals are communicated in the house over internal cable 436.

According to the fourth embodiment, communication line 460 comprises, for example, a coaxial cable, a fiber optic cable, or a twisted pair telephone line. In the case of a coaxial cable, connection point 463 may be a simple coaxial "T" connection. Connection point 463 may otherwise be a "splice" type connection wherein signals on communication line 460 are passed directly onto internal cable 436 in addition to being processed by associated electronics 470 over cable 465.

For example, communication line 460 may deliver conventional television signals to the house, some of which are scrambled. The conventional signals could be delivered directly to the house for reception on a conventional TV. Concurrently, via a "T" connection, associated electronics may process the scrambled television signals and deliver descrambled television signals over the house's internal power lines for reception by a remote device plugged into an electrical wall outlet. The remote device would put the descrambled signals back on conventional television coaxial cable or conventional video and audio cables for reception on the TV. Alternatively, the associated electronics may shift and superimpose the descrambled television signal onto internal cable 436 for reception on the conventional TV.

The utility meter according to the invention can provide numerous advantageous applications to the user. For example, the user can request information regarding the user's utility usage and bill. The user may utilize the utility meter according to the invention to pay the utility bill and other bills via credit card or other payment arrangements.

Another example is information access. The utility meter according to invention could provide a personal computer for the user. The personal computer can be interfaced to the user's home electronics and appliances. The personal computer may have access to various interactive computer services. For example, the user can utilize the utility meter according to the invention to access the internet and other information sources. The user could use their home television set as a display. The electric company may also provide computer software and games for use on the personal computer.

Both the electric company and the user could use the utility meter according to the invention advantageously for load management. The electric company could, for example, suspend electric service to non-essential circuits, such as hot water heaters, during peak demand times. The user could, for example, arrange to have the dishwasher run during lower rate hours. The electric company could also use the utility meter according to the invention for remote meter reading and also for detection of tampering by, for example, determining unusual power usage. Power outages and other problems with the electric company's distribution system can also be detected by the utility meter according to the invention.

The utility meter according to the invention provides a further advantage of being able to monitor and collect data on the television viewing habits of the user. Such information can be collected at the home and communicated to the electric company over the communication network. Such information is useful to determine the size of the viewing audience for various different television programs.

The utility meter according to the invention could be used for interactive instructional programs in the home. An instructional program could be viewed on the user's television set and the user could, for example, use a remote control device to respond to multiple choice questions posed by the instructional program.

Other advantages include the ability for the electric company to provide video signals, such as pay-per-view programs, to the user. The signals may be scrambled at the point of distribution and descrambled by the utility meter according to the invention. The electric company may also provide connection to various local and long distance telephone services through the utility meter according to the invention.

A particularly advantageous use of the utility meter according to the invention might include monitoring a personal medical alert device worn by a user inside the home. Such a device might transmit medical data on a periodic basis and be relayed to a physician through the utility meter according to the invention. Alternatively, such a device may be activated by the user to alert emergency medical services through the utility meter according to the invention. A similar advantage can be achieved to monitor movements of a user restricted to their homes by, for example, a court order.

Additional advantages and modifications will readily occur to those skilled in the art. For example, an alternative arrangement might include having the associated electronics located in a junction box on the utility pole or in another external location. While the foregoing embodiments have been described with reference to a house, it will be appreciated by one skilled in the art that the invention is applicable to other residential and commercial structures.

Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A utility meter interface apparatus connected between a utility company and a utility user's structure, said utility meter interface comprising:
   a utility meter for measuring utility usage, said utility meter having a housing; and
   a computer located in said housing and coupled to said utility meter, said computer providing an interface between a communication network and a device located internal to said utility user's structure.

2. A utility meter interface apparatus as recited in claim 1, wherein said communication network comprises one of a fiber optic cable, a coaxial cable, a twisted pair cable, and a wireless transmission media.

3. A utility meter interface apparatus as recited in claim 1, wherein said device is operable to one of transmit and receive one of a video signal, a voice signal, and a modem signal.

4. A utility meter interface apparatus according to claim 1, wherein said housing includes a meter box.

5. A utility meter interface apparatus according to claim 1, wherein said housing comprises an enclosure attached to a meter box.

6. A utility meter interface apparatus as recited in claim 1, wherein said utility meter comprises:

an electric power meter;
a base adapted to mate with a meter box and having a meter seal ring;
a meter enclosure containing said electric power meter and mounted to said base, said meter enclosure forming a seal with said meter seal ring; and
wherein said computer is located within said meter enclosure.

7. A utility meter interface apparatus as recited in claim 6, wherein said computer is adapted to communicate with said device over one of power lines located within said utility user's structure, a coaxial cable, a twisted pair cable, and a wireless transmission media.

8. A utility meter interface apparatus as recited in claim 1, wherein said computer determines one of a power factor, a power usage, and a power failure and is configured to communicate a respective one of said power factor, said power usage, and said power failure to said utility company over said communication network.

9. A utility meter interface apparatus as recited in claim 8, wherein said computer includes a battery backup.

10. A utility meter interface apparatus as recited in claim 1, wherein said device is operable to select a desired signal from said communication network for transmission to said device.

11. A utility meter interface apparatus as recited in claim 10, wherein said desired signal is scrambled on said communication network and said computer is operable to descramble said desired signal prior to transmission to said device.

12. A utility meter interface apparatus as recited in claim 1, wherein said computer comprises a personal computer.

13. A utility meter interface apparatus as recited in claim 12, wherein said device comprises a peripheral component operable with said personal computer.

14. A utility meter interface apparatus comprising:
    an electric power meter;
    a base adapted to mate with a meter box;
    a meter enclosure containing said electric power meter and mounted to said base, said meter enclosure forming a seal with said base; and
    a computer located within said meter enclosure and coupled to said electric meter, said computer comprising:
       a first interface for communicating with a communication network; and
       a second interface for communicating with a device located within a respective utility user's structure, said second interface being coupled to said first interface.

15. A utility meter interface apparatus as recited in claim 14, wherein said communication network comprises one of a fiber optic cable, a coaxial cable, a twisted pair cable, and a wireless transmission media.

16. A utility meter interface apparatus as recited in claim 14, wherein said second interface is adapted to communicate with said device over one of wiring located within to said utility user's structure and a wireless transmission media.

17. A utility meter interface apparatus as recited in claim 16, wherein said wiring comprises one of power lines, twisted pair wiring, fiber optic cables, and coaxial cables.

18. A utility meter interface apparatus as recited in claim 14, wherein said utility user's structure further comprises a circuit breaker box having a circuit breaker which is responsive to a signal, said circuit breaker box being coupled to power lines within said utility user's structure, and wherein said second interface is in communication with said circuit breaker box to selectively provide said signal.

19. A utility meter interface apparatus as recited in claim 18, wherein said circuit breaker comprises a solid state switch.

20. A utility meter interface apparatus as recited in claim 18, wherein said circuit breaker is operative to one of turn power on, turn power off, and reduce a voltage to said power lines in response to said signal.

21. A utility meter interface apparatus comprising:
   an electric power meter; and
   a computer coupled to said electric meter, said computer comprising:
      a network interface for communicating with a communication network;
      a structure interface for communicating with a device located within a respective utility user's structure, said structure interface being coupled to said network interface;
      a video processor coupled between said network interface and said structure interface;
      a descrambler coupled between said video processor and said structure interface;
      a modem processor coupled between said network interface and said structure interface;
      a voice processor coupled between said network interface and said structure interface;
      a meter interface coupled between said network interface and said structure interface, said meter interface also being coupled to said electric power meter; and
      a personal computer interface coupled between said network interface and said structure interface, said personal computer interface also being coupled between each of said video processor, said modem processor, said voice processor, said meter interface and said structure interface.

22. A utility meter interface apparatus as recited in claim 21, wherein said computer further comprises a battery backup.

23. A method of providing an interface between a communication network and a device located within a utility user's structure, comprising the steps of:
   providing a utility meter for measuring utility usage, said utility meter having a housing;
   adapting said utility meter with a computer coupled to said utility meter, said computer being located in said housing; and
   configuring said computer to provide said interface between said communication network and said device located within said utility user's structure.

24. The method as recited in claim 23, further comprising the step of configuring said computer to provide interactive access to digital information services over said communication network.

25. The method as recited in claim 23, further comprising the step of configuring said computer to provide load management capability to said utility user.

26. The method as recited in claim 21, further comprising the step of configuring said computer to provide load management capability to a utility company which provides utility services to said utility user's structure.

27. The method as recited in claim 23, further comprising the step of configuring said computer to provide an interface with peripheral computing devices located within said utility user's structure, whereby said computer and said peripheral computing devices operate as a personal computer.

28. The method as recited in claim 23, further comprising the step of configuring said computer to monitor television viewing of said utility user within said utility user's structure and to report information related to said television viewing over said communication network.

29. The method as recited in claim 23, further comprising the step of configuring said computer to communicate a detection of one of a tampering of said utility meter, a power outage at said utility meter, and a power distribution problem over said communication network.

30. The method as recited in claim 23, further comprising the step of configuring said computer to provide access to one of a local telephone service and a long distance telephone service over said communication network.

31. The method as recited in claim 23, further comprising the steps of:
   configuring said computer to monitor a first signal from an alert device;
   processing said first signal; and
   communicating a second signal over said communication network in accordance with said processing of said first signal.

32. The method as recited in claim 23, further comprising the step of configuring said computer to communicate one of utility usage, billing information, and payment information corresponding to said utility user over said communication network.

33. The method as recited in claim 32, further comprising the step of configuring said computer to display said one of utility usage, billing information, and payment information on a television located within said utility user's structure.

34. The method as recited in claim 23, further comprising the step of configuring said computer to provide an instructional program to said utility user over said communication network.

35. The method as recited in claim 34, further comprising the step of configuring said computer to communicate a response of said utility user to said instructional program over said communication network.

36. A method of providing an interface between a communication network and a device located within a utility user's structure, comprising the steps of:
   providing a utility meter for measuring utility usage;
   adapting said utility meter with a computer coupled to said utility meter;
   configuring said computer to provide said interface between said communication network and said device located within said utility user's structure; and
   configuring said computer to descramble a video signal, said video signal being received over said communication network.

37. A utility meter interface apparatus comprising:
   a utility meter; and
   a computer coupled to said utility meter, wherein said computer is configured to provide an interface between a communication network and a device located within a utility user's structure, and wherein said computer is configured to descramble a video signal, said video signal being received over said communication network.

* * * * *